United States Patent
Orndorff, Jr. et al.

(10) Patent No.: US 6,648,510 B2
(45) Date of Patent: Nov. 18, 2003

(54) SPA SUPER DEMOUNTABLE BEARING

(75) Inventors: Roy L. Orndorff, Jr., Kent, OH (US); Richard C. Spangler, Concord, OH (US)

(73) Assignee: Duramax Marine, LLC, Hiram, OH (US)

( * ) Notice: Subject to any disclaimer, the term of this patent is extended or adjusted under 35 U.S.C. 154(b) by 0 days.

(21) Appl. No.: 09/938,094

(22) Filed: Aug. 23, 2001

(65) Prior Publication Data

US 2002/0051586 A1 May 2, 2002

Related U.S. Application Data

(60) Provisional application No. 60/227,607, filed on Aug. 24, 2000.

(51) Int. Cl.[7] ............................................. F16C 3/00
(52) U.S. Cl. .................................... 384/98; 384/295
(58) Field of Search .......................... 384/97, 98, 282, 384/283, 284, 295

(56) References Cited

U.S. PATENT DOCUMENTS

| | | | |
|---|---|---|---|
| 1,376,043 A | | 4/1921 | Sherwood |
| 1,416,988 A | | 5/1922 | Sherwood |
| 1,510,804 A | | 10/1924 | Sherwood |
| 2,380,715 A | * | 7/1945 | Aker .......................... 384/98 |
| 2,382,270 A | | 8/1945 | Stratford |
| 2,439,971 A | * | 4/1948 | Freeman ..................... 384/98 |
| 3,497,278 A | | 2/1970 | Orndorff, Jr. |
| 3,561,830 A | | 2/1971 | Orndorff, Jr. |
| 3,826,547 A | | 7/1974 | Finefrock |
| 3,971,606 A | | 7/1976 | Nakano et al. |
| 3,993,371 A | | 11/1976 | Orndorff, Jr. |
| 4,607,964 A | | 8/1986 | Kramer et al. |
| 4,725,151 A | | 2/1988 | Orndorff, Jr. |
| 4,735,982 A | | 4/1988 | Orndorff, Jr. |
| 4,773,771 A | * | 9/1988 | Kramer ....................... 384/98 |
| 5,033,871 A | | 7/1991 | Ide |
| 5,372,430 A | | 12/1994 | Orndorff, Jr. et al. |
| 5,518,318 A | | 5/1996 | Orndorff, Jr. |
| 5,932,049 A | | 8/1999 | Orndorff, Jr. et al. |
| 5,971,617 A | * | 10/1999 | Woelki et al. ............. 384/295 |
| 6,238,093 B1 | | 5/2001 | Orndorff, Jr. et al. |

OTHER PUBLICATIONS

The Society of Naval Architects and Marine Engineers, *Propellers/Shafting 2000 Symposium*, Sep. 20–21, 2002, "New Extended Life Water Lubricated Bearings, Using a High Performance Polymer Alloy," Orndorff, Jr., Roy L. et al.
Smith, W.V. and Schneider, L.G., "Lubrication in a Sea–Water Environment," *Naval Engineers Journal* (1963), pp. 841–854.
Parker, B.G. and Raines, C.C., "New Life Prediction Technique Tests Seals in Severe Service Environment," *Elastomerics*, May, 1989, pp. 20–22.
Orndorff, Jr., "New UHMWPE/Rubber Bearing Alloy," Paper No. 99–TRIB–11, *The American Society of Mechanical Engineers*, New York, 1999 ("ASME Paper No. 99–TRIB–11").
MIL–P–18324, Amendment 2, Military Specification, "Plastic Material Laminated Phenolic, for Bearings (Water or Grease Lubrication)," U.S. Navy Dept., 1968.
MIL–B–17901B "Bearing Components, Bonded Synthetic Rubber, Water Lubricated," U.S. Navy Dept., 1990.
MIL–B–17901B (SH) amendement 3, Military Specification, "Bearing Components, Bonded Synthetic Rubber, Water Lubricated," U.S. Navy Dept., 1990.

* cited by examiner

*Primary Examiner*—Jack Lavinder
*Assistant Examiner*—Thomas J. Williams
(74) *Attorney, Agent, or Firm*—D. Peter Hochberg; Katherine R. Vieyra; Sean Mellino

(57) ABSTRACT

A bearing assembly for supporting a water-lubricated drive shaft includes a plurality of load-bearing staves made from a composite material known as Slippery Polymer Alloy (SPA and a plurality of rubber staves. The composite staves are spaced circumferentially around the bearing housing on the inner wall. The rubber staves are also spaced circumferentially around the bearing housing, the rubber staves being located between adjoining composite staves and having compression force on their end portions to lock the composite staves in place.

14 Claims, 11 Drawing Sheets

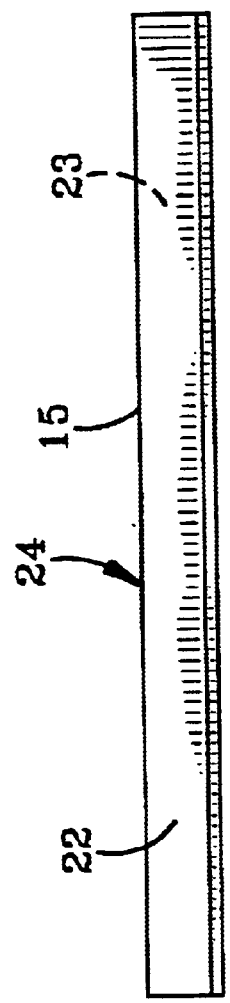
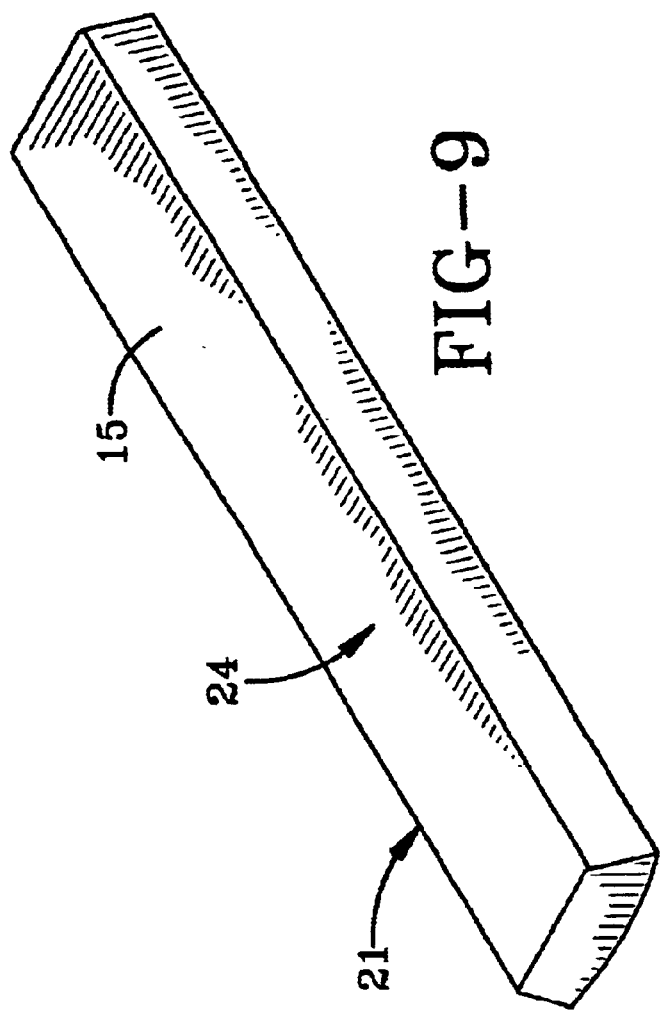
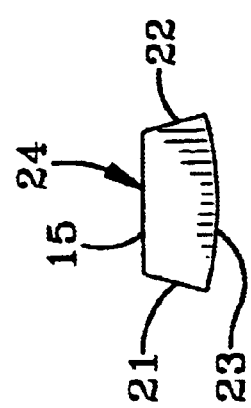

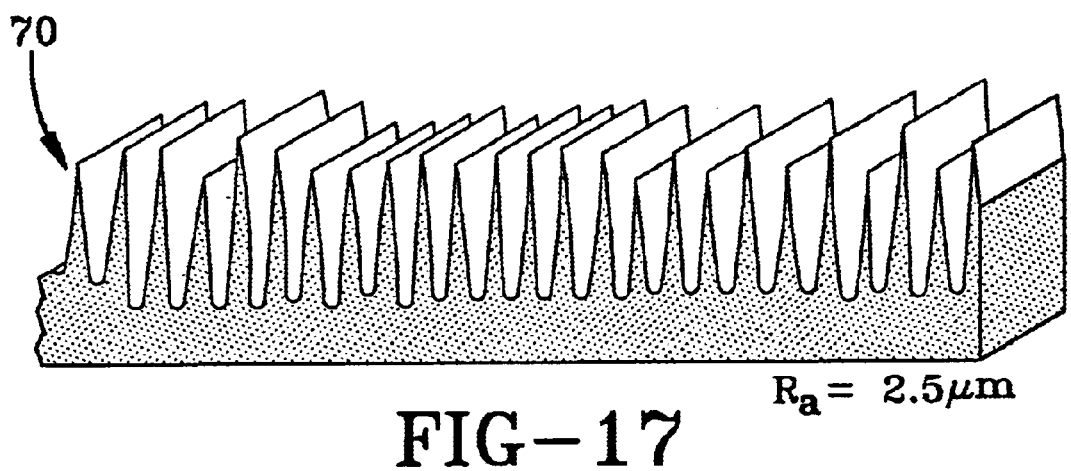
FIG-17 $R_a = 2.5\mu m$
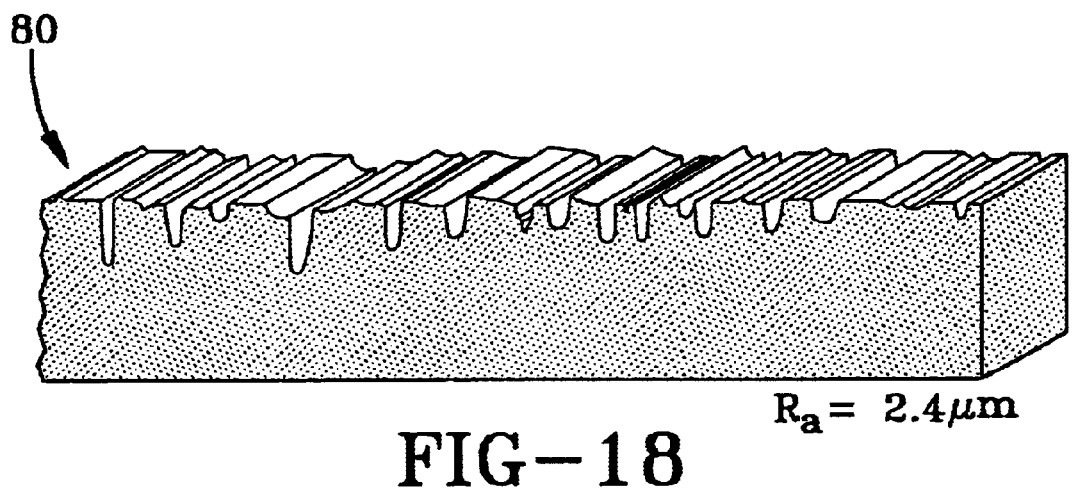
FIG-18 $R_a = 2.4\mu m$
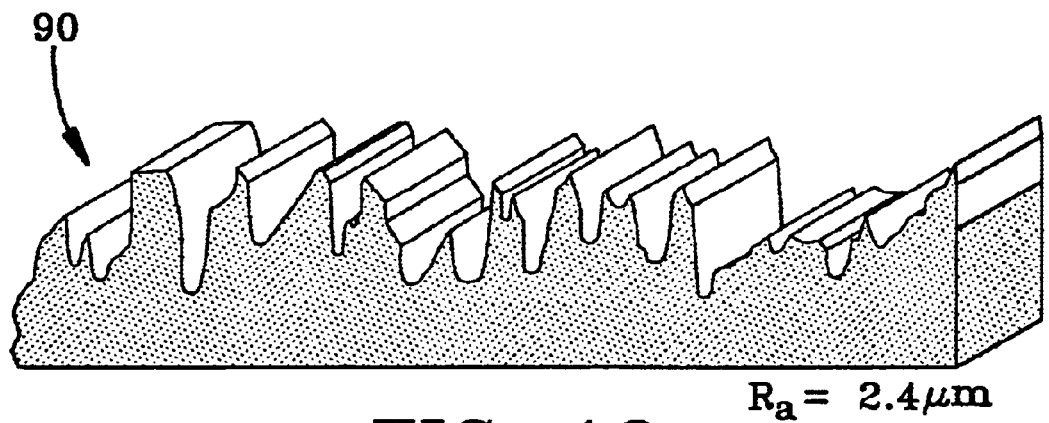
FIG-19 $R_a = 2.4\mu m$

SPA SUPER DEMOUNTABLE BEARING

CROSS-REFERENCE TO RELATED APPLICATION

This application claims priority of U.S. provisional patent application Ser. No. 60/227,607 filed Aug. 24, 2000, under Title 35, United States Code, Section 119(e).

BACKGROUND OF THE INVENTION

1. Field of the Invention

The present invention relates generally to a bearing assembly, and more particularly, to a new and novel cost-effective bearing assembly for use in supporting a water-lubricated propeller shaft such as in large ships, the bearing assembly having low bearing wear and greatly reduced shaft wear.

2. Description of the Prior Art

The need for lower first-cost and longer-lived components in marine propulsion shaft systems is always important because of the cost of acquiring and operating such systems. The challenge that confronts the rudder and main propulsion shaft water-lubricated bearings supplier is how to reduce the total bearing system wear. System wear life reduction concerns shaft/sleeve wear as well as bearing wear. There have been many attempts at producing a bearing with a low coefficient of friction to reduce the bearing wear. However, a low coefficient of friction does not guarantee low system wear. Shaft wear may be excessive while bearing wear is low.

In the prior art, bearing assemblies utilizing a combination of load bearing elements known as staves lining the interior of the bearing housing are well known. The staves have generally been made out of wood or elastomeric materials. Many patents exist for different arrangements of the staves within the bearing housing and materials used for the staves. Each of the various bearing arrangements seek to reduce the coefficient of friction between the bearing surface of the staves and the propeller shaft and to reduce the wear thereon of both members, primarily of the bearing material.

For example, U.S. Pat. No. 2,382,270 issued to Enz relates to a bearing assembly having staves therein and a keeper strip which is formed of laminated fibrous material such as paper, cloth, fabric, fiberglass, etc., impregnated with a resinous binder such as phenolic, urea, vinyl, and the like.

U.S. Pat. No. 3,497,278 issued to Orndorff, Jr., relates to a shaft bearing wherein the bearing surface is formed of strips of elastomeric material which line the inner periphery of a cylindrical housing between radially inwardly projecting lugs with each strip being secured therein by a locking bar inserted into a longitudinal groove in the strip.

U.S. Pat. No. 3,561,830 issued to Orndorff, Jr., relates to a resilient elastomeric insert for bearings of the type used for marine propeller shafts wherein the insert is formed of a low hardness elastomeric material and has rigid backing strips inserted in the elastomer spaced closely adjacent to the bearing surfaces.

U.S. Pat. No. 3,826,547 issued to Finefrock relates to the demountable water-lubricated bearing wherein a housing is formed with a cylindrical bore in which a plurality of symmetrically spaced keys are mounted. A complement of staves formed entirely of elastomeric material are positioned in the bore and directly compressed by a removable compression head to cause tight engagement between the bore and keys. Removal of the compression head allows the staves to assume their unstressed condition in which clearance is provided with respect to both the bore and the keyways.

U.S. Pat. No. 4,607,964 issued to Kramer et al. discloses a water-lubricated bearing assembly having a plurality of circumferentially spaced first set of bearing elements with substantially flat surfaces and water courses therebetween supporting a shaft for rotation. Certain ones or all of such bearing elements support a second set of bearing elements that are movable radially into supporting engagement with the shaft such that either the first set or second set of bearing elements are the prime supports for the shaft and wherein such first and second set of bearing elements have different coefficients of friction.

Heretofore, the material the staves in these bearing assemblies was composed of an elastomeric material such as natural rubber or a synthetic rubber, such as nitrile rubber, or a combination of these materials that could be vulcanized to exhibit both low wear and a low coefficient of friction when lubricated with water. A physical property called "hydrodynamic lubrication" occurs under certain conditions with bearings made from these materials and lubricated with water. When hydrodynamic lubrication occurs, a very thin film of water is pumped constantly between the bearing surface and the propeller shaft by the rotating propeller shaft, resulting in very low friction between the two surfaces.

The new super demountable designs combine the best features of the demountable designs with the performance advantages of the new Slippery Polymer Alloy (SPA). SPA is the subject matter patented in U.S. Pat. No. 4,735,982 issued to Orndorff, Jr.

There already exists one patent for a bearing assembly using the new Slippery Polymer Alloy (SPA). U.S. Pat. No. 5,932,049 issued to Orndorff, Jr., provides a top layer of SPA provided on the stave element. SPA exhibits superior system wear resistance properties at all shaft speeds.

In a paper entitled "Lubrication in a Sea-Water Environment," Naval Engineers Journal (1963), pp. 841–854, the authors commented on judging the performance of propeller shaft bearings and said that static and running friction, noise-producing tendencies and life are very relevant. Cost must be added today in the case of both naval and commercial vessels. Their list of the factors believed to be of concern in bearing and shaft sleeve life are listed below:

1. Load
2. Rubbing Velocity
3. Velocity-Time Interactions
4. Time at Zero Velocity
5. Total Operating Time
6. Shaft and Bearing Roughness
7. Type and Amount of Abrasive
8. Uniformity of Loading
9. Shaft and Bearing Materials All of these factors must be considered in bearing and shaft sleeve design. For example, the life of most materials is adversely affected by increases in pressure either by adding extra radial load or by shortening of the bearing. When their paper was written, the best water-lubricated bearing designs they considered were made of harder rubber brass-backed staves having machined bearing surfaces and overthick rubber with improper land edges, all of which contributed to unpredictable and intermittent hydrodynamic operation. Excessive time at zero velocity, commonly called dwell time, results in an elevated breakaway coefficient of friction at shaft start-up for many bearing materials. The desired operating time and operating profile (number of start-ups, time spent at low shaft speed) is very important especially in military operations. Shaft and bearing roughness must have the correct finish and texture combination. The possibility of operating in abrasive conditions must be considered. The uniformity of loading is strongly affected by such things as shaft alignment and bearing length, as well as the compressive stiffness of the bearing material. Finally, shaft and bearing materials are listed last, but not the least in importance even when there were only a limited number of suitable material candidates for water-lubricated bearings.

A history of water-lubricated bearings will help to further understand the invention described below.

In 1956 John Penn described to the Institution of Mechanical Engineers his series of experiments running different bearing materials in a tank of water. These experiments led to his invention of the first successful (lignum vitae) water-lubricated bearings. Over the years, various other wood bearings have been developed, such as oil-impregnated maple, which has found a niche in certain types of agricultural machinery where the lubricant is particularly aggressive. Glass bearings were tried as were various ceramic combinations, some of which are still used today. Many types of plastics have been tried with water lubrication over the years. One that has lasted into modern times has been phenolic, a thermosetting plastic reinforced with various natural and manmade fibers. Lignum vitae bearings were in wide use in commercial and international naval vessels until the 1960's. One of the most well-known applications of lignum vitae bearings was the main shaft bearings for the large number of Liberty and Victory ships constructed in the United States during World War II. After World War II very few water-lubricated bearing materials could satisfy the very stringent friction and wear requirements of the U.S. Navy. Rubber staved (brass backed) bearings did satisfy the requirements for many years. In the 1970's the brass-backed rubber staves were replaced by softer rubber and plastic (UHMWPE) backed designs of a more efficient design.

In 1944, the elastomer (rubber) had been changed from natural (tree grown) rubber to nitrile, a synthetic elastomer, because some natural rubber staved U.S. Navy ship bearings experienced reversion, which is a melting of the thermoset (cured) compound. This was caused by hysteric heating resulting from repeated dynamic impact loading due to combat damage (bent shafts and broken propeller blades) suffered at the Battle of Midway in June, 1942. Nitrile elastomers do not revert. Naval brass-backed rubber bearings were regarded as too expensive for commercial ship applications due to the complex dove-tail slots and multiple metal shell housings required. In addition, there was a major move starting approximately 30 years ago to adopt sealed oil-lubricated systems for stem tube bearings in large commercial ships. Recently, because of cost and oil pollution problems (all conventional oil seals leak sooner or later) there has been a move back to water-based lubricant systems.

Lignum vitae bearings wear the shafts excessively when abrasives are present and the sources of good timber are scarce today. Fiber reinforced phenolic bearings and polyurethane bearings wear excessively under abrasive conditions and also wear shafts. Polyurethane bearings suffer reversion (melting) under dynamic impact conditions, as did the original natural rubber bearings. In addition, polyurethane bearings suffer from hydrolysis, which is an irreversible softening and cracking when exposed to warm water.

The Romor®, nitrile rubber UHMWPE-backed bearing staves have a reduced breakaway coefficient of friction that is still higher than most of the other non-rubber materials, as disclosed in U.S. Pat. No. 3,993,371. It was discovered that reducing the rubber thickness by 50% and molding a very smooth flat rubber surface reduced both friction and wear of Romor® bearings by over 90%. Romor® stave bearings result in a lubrication characteristic in which lubricant-trapping pockets are generated this characteristic is called plasto-elastohydrodynamic lubrication. Rubber bearings also tend to wear the shaft under abrasive conditions, but they still can meet the military specification Mil-B- 17901B (Bearing Components, Bonded Synthetic Rubber, Water Lubricated, U.S. Navy Dept., 1990) requirements. Polyurethane bearings cannot pass the very difficult friction and wear requirements in this specification.

Thin rubber bearings have different wear and friction action from harder nonmetallic materials used in bearings. When a radial load is initially applied to a thin rubber bearing, the deflection is elastic and disappears if the load is removed. After a short period of time under load, the deformation becomes permanent and remains after load removal because of the compression set present in every rubber compound. This causes the plasto-elastohydrodynamic lubrication referred to above. This type of lubrication is enhanced by the special elastic-creep properties of some rubber compounds. As explained above, it was found that thin nitrile rubber bearings for rotating shafts or journals partially immersed in water developed a continuous, unbroken film of water resulting from hydrodynamic lubrication. It was determined that the pressure developed by the hydrodynamic pumping process helped deform the rubber, pushing it out towards the sides and ends of the bearing contact patch, forming a non-contact region or pocket in the center of the contact patch. i.e. plasto-elastohydrodynamic lubrication. It was further found that bearing test sample patches made of polymeric materials which are harder than rubber initially deflected less than the samples made of thin rubber, but eventually developed deep grooves and wore away after partially completing the very severe 28-day procedure (clean wear, or the equally severe 10-hour abrasive wear test).

The assignee of the present application has manufactured and sold for over 25 years the demountable bearing as a cost-effective competitor to conventional molded rubber bearings that have metal or composite shells. The all-rubber demountable bearing is made up of an assembly of two-land staves assembled hand-tight into the housing. The staves are axially longer than the housing. An end ring is bolted onto the end of the housing, axially compressing the rubber staves, which in turn expand circumferentially to tightly lock themselves in place thereby preventing torsional rotation. Elimination of the bearing shell substantially reduces the cost. The very thick rubber wall provides considerable available wear-down thickness. However, the friction torque for the typical demountable bearing is very high because of the concave shape of the lands, the wall thickness and their machined rubber surfaces.

Some of the foregoing material is disclosed in a paper entitled "New Extended Life Water Lubricated Bearings, Using a High Performance Polymer Alloy" by Roy L. Orndorff, Jr., and Richard V. Sheppert, which is incorporated herein by reference.

The present invention takes advantage of the superior wear resistance properties of SPA by utilizing staves made completely from SPA. A plurality of composite staves made from SPA are spaced equidistantly on the circumference of the interior of the bearing assembly housing and aligned in the axial direction of the housing. A rubber stave is placed in between adjacent composite staves to hold them in place. The rubber staves have a thickness somewhat less than the composite staves so that a longitudinal surface channel is formed therebetween. The channels allow water to ebb and flow to the area between the bearing surface of the composite stave and the rotating shaft. Each of the rubber staves is slightly longer than the adjacent composite staves. Upon assembly, the rubber staves extend from the end of the bearing housing. A compression ring is bolted to the end of the housing. As the compression ring is tightened, the rubber staves are axially compressed and forced to expand circumferentially in between the composite staves, tightly locking them in place and preventing torsional rotation.

SUMMARY OF THE INVENTION

It is an object of the invention to provide a bearing assembly utilizing a plurality of composite staves and rubber staves, wherein the rubber staves are intermittent with the composite staves to lower the coefficient of friction at all shaft speeds.

It is another object of the invention to provide a bearing assembly that has superior system wear resistance properties of the contacting surfaces of the load bearing members and the contacting portions of the rotating shaft.

It is yet another object of the invention to provide a bearing assembly where the composite material is Slippery Polymer Alloy (SPA).

It is yet still another object of the invention to provide a bearing assembly utilizing a plurality of composite staves and rubber staves placed between adjacent composite staves wherein the rubber staves are less thick than the composite staves so that a longitudinal channel is formed therebetween where ambient water, such as seawater, can flow to lubricate the bearing surfaces of the composite staves contacting the rotating shaft.

It is yet still another object of the invention to provide a bearing assembly utilizing a plurality of composite staves and rubber staves placed between adjoining staves to lock the composite staves in place in the bearing housing.

It is another object of the invention to provide a bearing assembly utilizing a plurality of composite staves and rubber staves placed between adjoining staves wherein the rubber staves are axially compressed by a compression ring to force them to expand circumferentially and lock the composite staves in place.

A still further object is the provision of a stave bearing assembly which aids in grit rejection from the assembly and the shaft with which the assembly is used.

Yet a further object is to provide an improved bearing having no metal parts

An additional object is the provision of a ship bearing assembly where the bearing clearance is easily adjustable.

It is also an object to provide a self-aligning stave bearing structure

It is also another object of the invention to provide an improved staved bearing which can be made using conventional equipment.

Another object is to provide an improved staved bearing assembly having load-carrying staves with lugs that contact a shaft at locations different from the lugs of the other staves.

It is also an object to provide an improved staved bearing structure which can be designed to act hydrodynamically.

Another object is to improve fuel efficiency of a ship or boat.

A further object is to provide better performance of a bearing assembly with increased load.

A still further object is to provide a bearing assembly which eliminates the need for a bearing shell.

An additional object is the provision of a bearing assembly having lower stave installation time and costs.

Still a further object is the provision of a bearing assembly which is capable of water lubrication and for dry runs.

Another object is the provision of a bearing assembly generating low noise at low drive shaft speed.

It is a general object to provide an improved bearing structure for water-lubricated shafts which is economical and efficient in manufacture and use and which is effective in use over a long duration of time.

The foregoing and other objects of the invention are achieved by means of a bearing assembly comprised of a plurality of composite staves arranged circumferentially around the interior of the bearing housing. Both the composite staves and the rubber staves are aligned parallel to the longitudinal axis of the bearing housing. Each of the composite staves is separated from the adjoining composite staves by a rubber stave. The composite stave is made from SPA. Only the composite staves are in contact with the propeller shaft. The rubber staves are less thick than the adjoining composite staves so that a longitudinal channel is formed between adjoining composite staves. This channel provides a means where seawater can enter and exit the bearing housing to lubricate the area between the bearing surfaces of the composite stave and the rotating shaft through "hydrodynamic lubrication."

BRIEF DESCRIPTION OF THE DRAWINGS

FIG. 7 is a side view of one of the composite staves;

FIG. 8 is an end view of the stave shown in FIG. 7 thereof;

FIG. 9 is a perspective view of the stave shown in FIGS. 7 and 8;

FIGS. 17–19 are enlarged perspective views of a shaft surface having been engaged by SPA bearing staves.

DESCRIPTION OF THE PREFERRED EMBODIMENT

Figure 1:
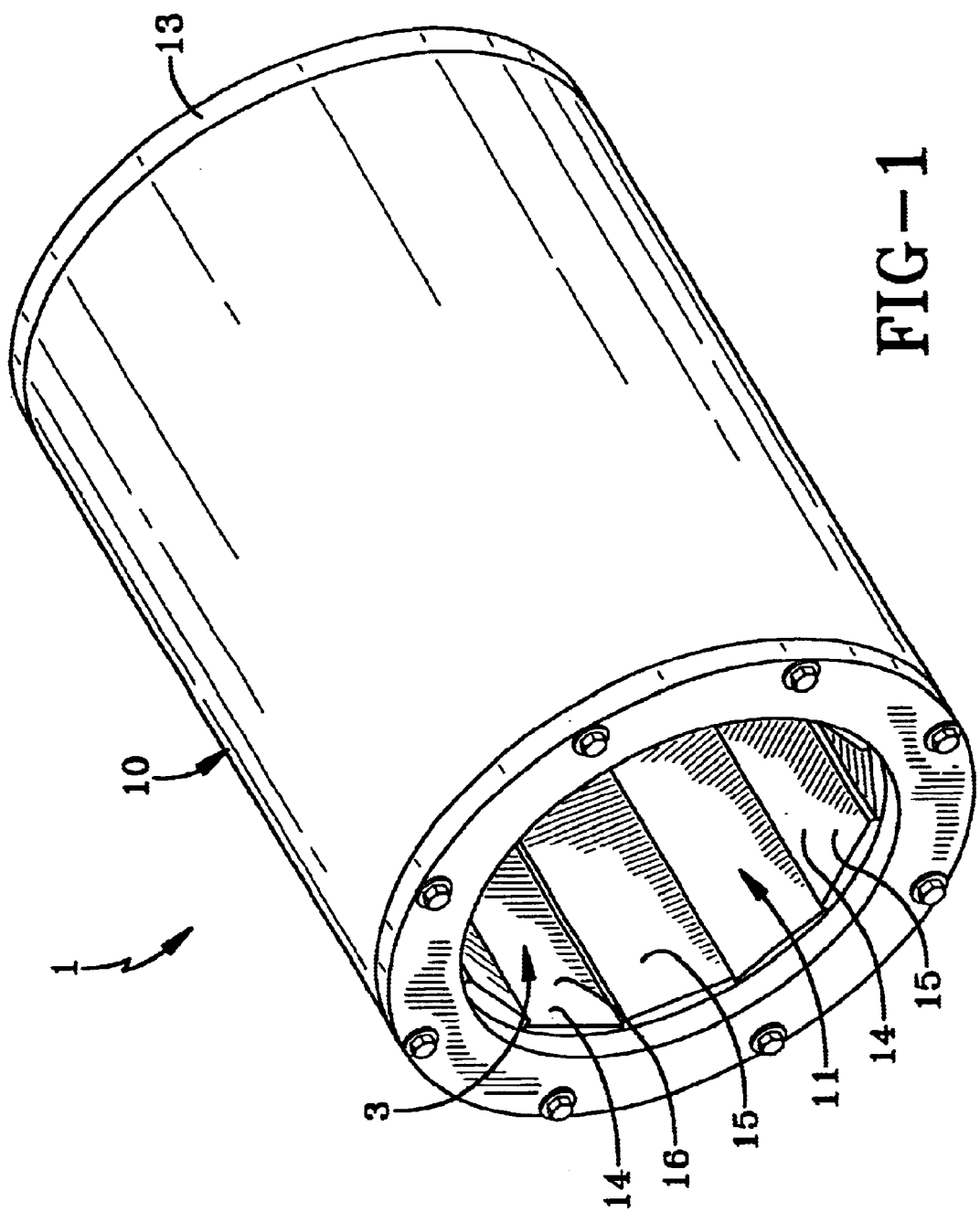
FIG. 1 is a front perspective view of the preferred embodiment of a SPA super demountable bearing.
Figure 2:
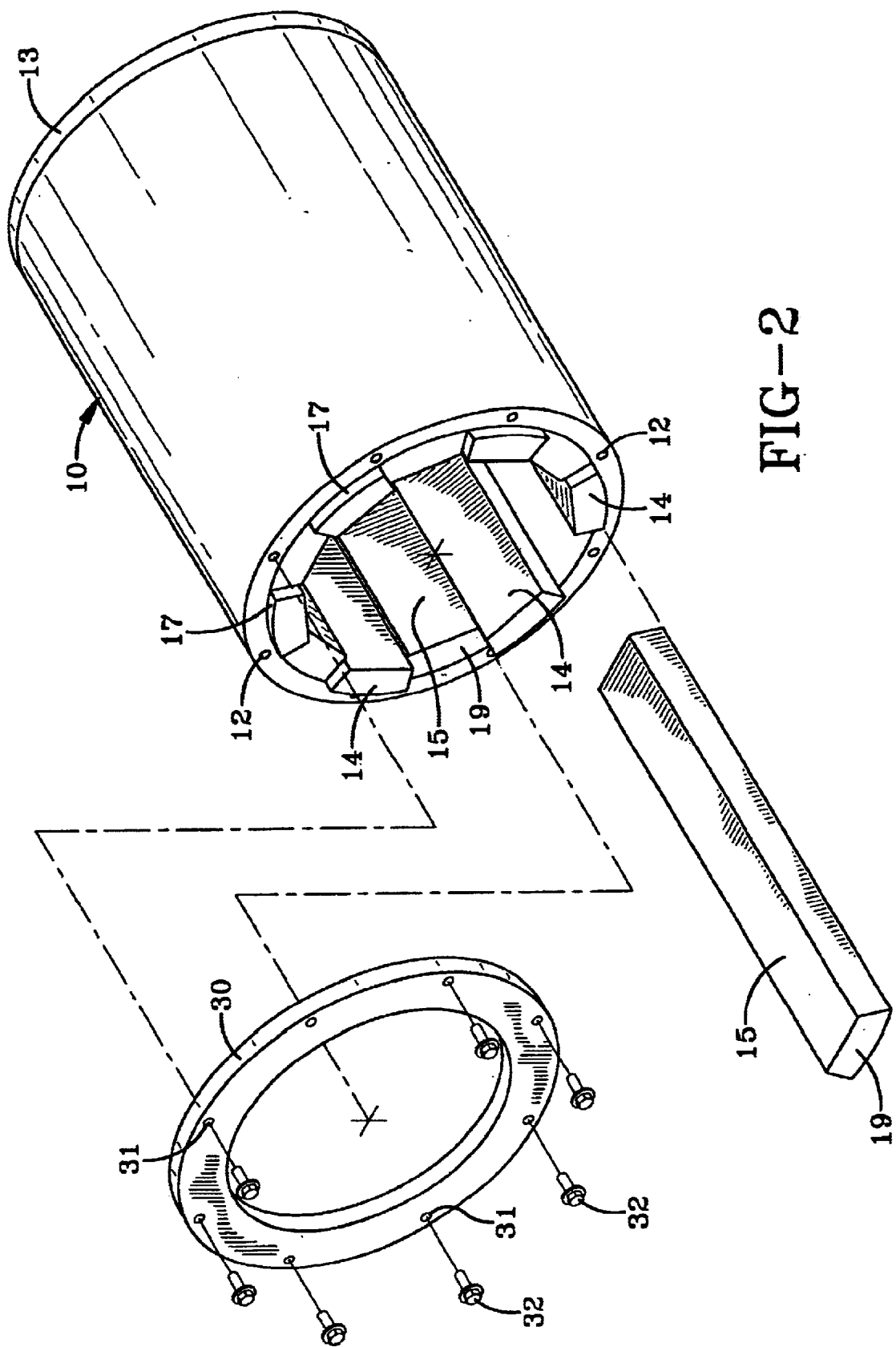
FIG. 2 is an exploded front perspective view thereof.

Referring first to FIG. 1, a housed bearing assembly 1 is shown having a longitudinally extending bearing housing 10 for use in ships for supporting the ship's propeller shaft or rudder. A bearing assembly 3 is on the inside of housing 10, and a central bore 11 is provided for receiving the shaft of a ship. Housing 10 has a single annular face having a plurality of circumferentially spaced threaded bores 12 (FIG. 2) extending longitudinally therein, as shown in FIG. 2. The opposite end of housing 10 has a retaining ring 13 permanently attached thereon for retaining the bearing assembly within housing 10. Housing 10 is preferably made from bronze, carbon steel or an equivalent metal, and retaining ring 13 is made from the same material. Bearing assembly 3 has a plurality of circumferentially spaced longitudinal staves 15 made from the composite material Slippery Polymer Alloy (SPA) discussed above and further described below. A plurality of longitudinal staves 14 made from an elastomeric such as rubber are also circumferentially spaced on the inner wall of the housing 10. A rubber stave 14 is located between each of the adjoining composite staves 15 to hold the composite staves 15 in place. The rubber staves 14 have a radial thickness less than the composite staves 15 so that a longitudinal channel 16 is formed between adjacent composite SPA staves 15. The longitudinal channels 16 provide a passage for water to lubricate the bearing surfaces of the composite staves 15. The rubber staves 14 make no physical contact with the propeller shaft and are non-load bearing. The outside or housing facing surface 17 of rubber staves 14 and the corresponding surface of SPA staves 15 are contoured as by machining to be a portion of a cylinder so that they engage the inner surface of housing 10. The inside or shaft-facing surface of SPA staves 15 have a flat land according to one embodiment.

Referring now to FIG. 2, each of the plurality of rubber staves 14 are longer than the composite SPA staves 15 and extend from the housing 10 a short length of preferably from 1.5% to 3% of the final installed length, prior to the installation of a compression ring 30 on the annular face of housing 10. Compression ring 30 can be non-metallic, such as ultra high molecular weight polyethylene (UHMWPE) or the like, or metallic, such as of an appropriate carbon steel, stainless steel or bronze. Upon installation of compression ring 30, each of the rubber staves 14 is compressed axially into the housing 10. Compression ring 30 has a plurality of circumferentially spaced bores 31 which receive cap screws 32 which are threaded into the respective bores 12 in housing 10 to thereby securely fasten the bearing assembly within the housing 10. The circumference of the rubber staves 14 expands as each of the rubber staves 14 is compressed axially. The expanding rubber staves 14 lock the adjoining composite staves 15 in place within housing 10. One of the composite staves 15 in FIG. 2 is removed to show the placement within housing 10.

In the operation of the bearing assembly, assuming that the propeller shaft is stationary, the propeller shaft will remain in contact with the bearing surfaces of the composite SPA stave 15 under essentially dry conditions even though the bearing assembly is under water because there is no lubricant (water) between the bearing surfaces of the composite staves 15 and the propeller shaft. As the propeller shaft begins to rotate, and as the dry friction is overcome, sufficient water comes in between the rotating propeller shaft and the bearing surfaces of the composite staves 15 to water lubricate the bearing surface. In this condition of operation, the water-lubricated bearing surfaces of the composite staves 15 have a lower coefficient of friction than they had as dry surfaces. However, as hereinafter described, the composite SPA material presents superior wet and dry friction and wear properties to provide a material advantage for use as a water-lubricated bearing. A complete discussion of the construction of the bearing assembly made from a plurality of composite SPA staves 15 made from SPA interlocked with rubber staves 14 can be found in the earlier mentioned paper entitled "New Extended Life Water Lubricated Bearings Using a High Performance Polymer Alloy." As explained in the referenced Orndorff, Jr., et al. paper, several test machines were used as discussed below.

Three laboratory test machines were used to test the SPA staves that have proven over the years to give results that are reliable indicators of later bearing performance. The reported results are discussed with an emphasis on what they mean in the design of actual bearings. A more complete and rigorous discussion is found in Orndorff, Roy L., Jr., "New UHMWPE/Rubber Bearing Alloy," Paper No. 99-TRIB-11, The American Society of Mechanical Engineers, New York, 1999 ("ASME Paper No. 99-TRJB-11"). Competing materials were also tested during this program for comparison purposes.

KOMMERS ABRASIVE WEAR TESTER (KAT)—The need for and use of this two-station block-on-drum swing arm machine was discussed (Smith, W. V. and L. G. Schneider, 1963, "Lubrication in a Sea-Water Environment," Naval Engineers Journal, (1963): 841–854). A recent version is used as the qualifying wear test means for two Military Specifications, MIL-B-17901 B (SH) amendment 3, Military Specification, Bearing Components, Bonded Synthetic Rubber, Water Lubricated, U.S. Navy Dept., Washington, D.C., 1990, and MIL-P-18324, Amendment 2, Military Specification, Plastic Material, Laminated Phenolic, for Bearings (Water or Grease Lubrication) U.S. Navy Dept., Washington, D.C., 1968. It is a very severe system wear test in that the wear of the bearing material (block) is determined as well as the wear of the shaft (drum). The drum diameter is 2.10 inches (53.3 mm) and its speed is 98 revolutions per minute. Normal load was 1.76 lbs. (7.83N) and test time per sample is ten hours. The lubricant is tap water containing 0.04% by volume sulfonated oil (Triton X-100) as a wetting agent, which flows onto the drum at the rate of 75 cc/minute. The abrasive is 54 grit aluminum oxide, fed to the contact area by means of a conveyor belt at 1.25 grams/minute. Grit is discarded after one pass. Samples are flat blocks, 1 inch (25.4 mm) by 1 inch (25.4 mm) by 1.0 inch (25.4 mm) thick. Sample wear is the average wear of three identical samples tested on the same drum. Drum wear is the accumulated total wear caused by the three samples. Sample and drum wear is measured in the area of maximum wear to the nearest 0.001 inch (0.03 mm).

Maximum wear limits in the more severe Military Specification discussed above are 0.10 inch (2.54 mm) average for three identical bearing blocks and 0.03 inch (0.8 mm) drum wear. The severity of the test is determined by the ten-hour test duration and the fact that the grit is discarded after one pass. The KAT tests the (abrasive) wear at one extreme of the performance envelope. The Wear Test Machine (WM) determines the (adhesive) wear performance at the heavy-load, clean water opposite end of the envelope.

WEAR TEST MACHINE (WM)—This three station block-on-drum swing arm tester has a drum diameter of ten inches (254 mm). The original WM was designed during Word War II and this was the main shaft diameter of one class of U.S. Navy submarines at the time. Shaft speed is 20 revolutions per minute and test duration is 28 days (672 hours). Sample size is two inches by two inches (50.8 mm by 50.8 mm) by 0.75 inch (19.1 mm) thickness. A known control sample is always run on one of the three stations, the location of which is changed for each run. The normal load on each sample was 984.7 pounds (4.38 kN). The normal load is used for all calculations. The projected pressure of 210 psi (1448 kPa) is used for comparison purposes and is calculated as if the sample was a segment of the heaviest loaded stave in a full bearing having the 10 inch (254 mm) shaft diameter and operating at the projected pressure (bearing radial load divided by the product of the shaft diameter and the axial length). Wear is determined by two methods. First, every workday each arm deflection is recorded. This is the equivalent of determining the clearance increase in a bearing which includes elastic deflections and creep as well as actual wear. Secondly, dry weight loss for each sample is measured at the end of each test run. Then the weight loss is normalized to a standard (seawater) temperature of 60° F. (15.6° C.) using the Arhenius Principle discussed in Parker, B. G. and C. C. Raines, "New Life Prediction Technique Tests Seals in Severe Service Environment," *Elastomerics,* (May, 1989): 20–22. Temperature standardization was necessary because the water in the WM tank was depth controlled but not temperature controlled. The machine operates in a temperature and humidity controlled laboratory atmosphere. Ambient and tank water temperatures were recorded daily.

Later in the test program the sample axial length was reduced to 1 inch (25.4 mm) in order to double the contact pressure on the samples. The length-to-diameter ration was therefore reduced from 0.2 to 0.1.

FULL BEARING TESTER (FBT)—The FBT is intended to test actual full bearings either staved, molded or solid packed. Shaft diameter is 6.75 inches (171.5 mm) and maximum axial length is 5.75 inches (146.1 mm). Higher projected pressures and other modeling set-ups are possible by reducing the test bearing axial length. Shaft speeds can be varied between 0 and 450 revolutions per minute. Transmitted drive torque is measured by a shaft-mounted differential dynamometer invented in the 18$^{th}$ century. It is a very rugged method, easy to calibrate, accurate and repeatable over a wide force range. The calibration process removes all extraneous sources of friction. Bearing load is applied by means of a compressed air cylinder acting against one end of a lever arm, the other end of which is attached to the bearing housing.

A description of SPA and its composition are discussed below. However, the results of the tests of SPA on the foregoing machines are described first.

Listed below in Table 1 from Orndorff, Roy L., Jr., "New UHMWPE/Rubber Bearing Alloy," Paper No. 99-TRIB-11, *The American Society of Mechanical Engineers,* New York, 1999 ("ASME" Paper No. 99-TRIB-11) are several KAT results. The SPA block wear is close to that for the 85 Shore A (Romor®) rubber wear. Both passed the military specification requirement. Especially noteworthy is the zero drum (shaft) wear results for the SPA sample. The present inventors know of no other example recorded in over 40 years of KAT testing in which a sample had acceptably low block wear in combination with zero drum wear.

TABLE 1

Kommers Abrasive Test Results

| | Sample | Block Wear, inch | 70-30 Cu—Ni Drum Wear, inch |
|---|---|---|---|
| 1 | Slippery Polymer Alloy (SPA), 63 Shore D, USA | 0.038 | 0 |
| 2 | Rubber, Romor ® Stave, 85 Shore A, USA | 0.033 | 0.020 |
| 3 | Polyurethane, 70 Shore D, Canada | 0.693 | 0.006 |

1 inch = 25.4 mm

These test results lead to the conclusion that the abrasive wear rate of the new Slippery Polymer Alloy (SPA) will be acceptable and the wear rate of the drum (shaft) will be much reduced. This will permit a reduced shaft sleeve wall thickness or, in some cases, the elimination entirely (in large ships) of a shaft sleeve. The polyurethane samples had low drum wear but unacceptable very high block wear.

Listed below in Table 2 are some results from the heavy load, clean water Wear Test machine (WM). The all-inclusive term Specific Wear (based on the dry weight loss, the shaft velocity, the test time, the radial load and the final wear scar area) is used for comparison purposes. Included are values for Ultra High Molecular Weight Polyethylene (UHMWPE) as well as for the polyurethane sample (line 4) and one widely used fiber reinforced phenolic marine bearing sample (line 5).

TABLE 2

Wear Test Data, 210 psi (1448 kPa) Projected Pressure

| | Sample | Specific Wear | Comments |
|---|---|---|---|
| 1 | SPA, 63 Shore D Specific Gravity = 1.029 | 1.06 | Slippery Polymer Alloy |
| 2 | 85 Shore A. Rubber (Used in stave bearings) S.G. = 1.200 | 1.00 | Used in Romor ® Stave Bearings |
| 3 | UHMPWE 73 Shore D, USA S.G. = 0.930 | 115.00 | Removed, 162 hours Excessive Wear |
| 4 | Polyurethane 70 Shore D, Canada S.G. = 1.168 | 3.45 | Removed, 571 hours Excessive Wear |
| 5 | Fiber Reinforced Phenolic 90 Shore D, UK S.G. = 1.631 | 20.20 | Failed, 4.4 hours Stick/Slip Noise |

Specific Wear = $10^{-10}$ in$^5$ – mm/ft – lb – hr
SI: Specific Wear = Table 2 Value × 1.3 = $10^{-8}$ mm$^3$kPa – m

TABLE 3

Specific Wear, SPA v. Rubber

| | | Projected Pressure | |
|---|---|---|---|
| | Sample | 210 psi (1448 kPa) | 420 psi (2896 kPa) |
| 1 | SPA 63 Shore D | 1.06 | 0.21 |
| 2 | 85 Shore A Rubber | 1.00 | 5.58 |

Specific Wear = $10^{-10}$ in$^5$ – mm/ft – lb – hr
SI: Specific Wear = Table 3 Value × 1.3 = $10^{-8}$ mm$^3$kPa – m Table 3 compares the WM data at 210 psi (1448 kPa) with that obtained after the projected pressure was doubled by reducing the axial length of the samples by 50%.

The reduction of SPA wear by 80% when the radial load was doubled was unexpected. What was expected was the more typical 458% increase in wear experienced by the rubber sample. The radial load was doubled by reducing the axial length of the sample because it was decided that it would be unsafe to double the weights on the load arms. The reduction in axial length was fortuitous, because it demonstrated that the new alloy could be deflected to form a lubricant-trapping pocket similar to that occurring with Romor® staves (plasto-elastohydrodynamic lubrication). The radial load required to cause the phenomenon to occur was significantly higher for SPA because of its much higher modulus. (SPA can be elastically distorted in compression by 40%.)

The conclusion to be drawn from the above is that a large reduction in SPA wear can be realized if the contact pressure and Shape Factor are in the same range as those for the half-length SPA wear sample. Shape Factor for an elastomer is defined as one loaded area divided by the total perimeter side area that is free to expand. It is also obvious that very small length-to-diameter SPA samples can perform hydrodynamically. The shorter WM SPA sample had an L/D ratio of 0.1.

Figure 3:
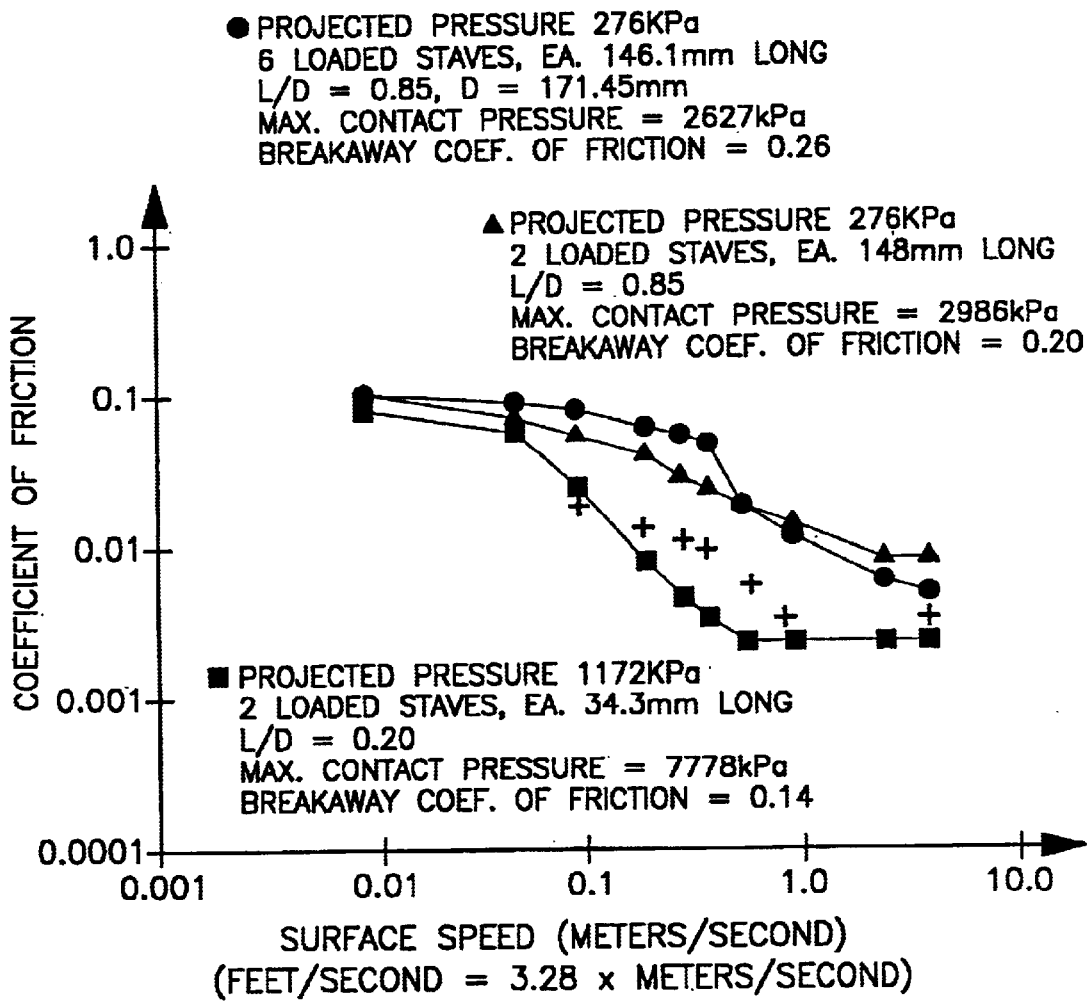
FIG. 3 is a series of graphs of coefficient of friction versus surface speed values for SPA bearings in a testing machine.
Figure 4B:
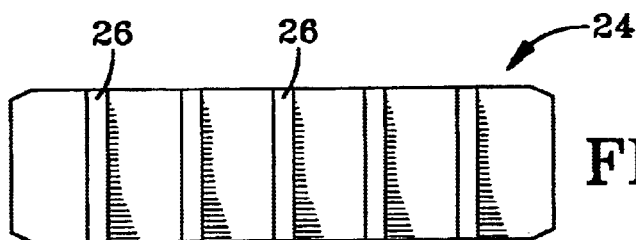
FIGS. 4a and 4b are side and front views of a SPA bearing stave with lugs.
Figure 4A:
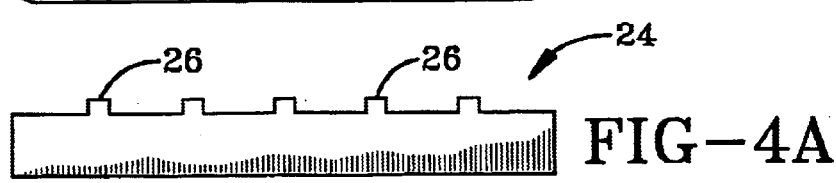

FIG. 3 modified from ASME Paper No. 99-TRIB-11 compares Full Bearing Tester coefficient of friction versus shaft surface speed results for a SPA bearing with the standard six loaded staves, a bearing with only two loaded staves and a two loaded stave SPA bearing in which the two staves are very short, L/D=0.2 compared with an L/D value of 0.85 for the other two bearings. Actual contact pressure was 1,128 psi (7778 kPa) for the short bearing. This was greater than the equivalent value for the wear test sample 827 psi (5702 kPa). The short staved sample clearly developed hydrodynamic lubrication at a much lower shaft speed after the 24 hour run-in than did the two hour bearings. To verify that this was due to plasto-elastohydrodynamic action and not to a shortening of the bearing, two full-length staves 24, one of which is shown in FIGS. 4A and 4B having a length of 5.75 inches (146.05 mm), L/D=0.85, were tested, each having five spaced lugs 26 along the full length. Each lug was 0.25 inch (6.35 mm) long in the axial direction and 0.25 inch (6.35 mm) deep. The crosses plotted on FIG. 3 are the test results for the lugged bearing after 24 hours run—even though the notch depth was 33% deeper than optimum, resulting in a smaller shape factor (bulge ratio) value which in turn reduced the contact pressure below the optimum range. It is obvious that when SPA is used any contact can be made to act hydrodynamically. Any coefficient of friction value below 0.01 is regarded as being well into the hydrodynamic range according to Fuller, *Private Communication,* approximately 1987.

SPA is a thermoplastic-rubber polymer alloy made from a thermoplastic plastic and a pre-vulcanized thermoset rubber compound, along with a smaller amount of dry lubricant such as graphite. The alloy is a heterogeneous composition wherein the plastic exists in a continuous phase and the thermoset is dispersed therein as a discontinuous phase. In other words, a thermoplastic matrix is formed having the thermoset compound and the lubricant dispersed therein as opposed to an admixture.

The thermoplastic plastic binder compound can be any polymer which exhibits tough, low friction and good wear resistant properties. A specific group of such polymers are the various ultra high molecular weight polyethylenes which are known in the art as well as in the literature. Ultra high molecular weight polyethylenes are generally classified as those having an average molecular weight of greater than 2.5 million, that is from about 3.0 million to about 7.0 million using the solution viscosity method. A desired range is from about 4 million to about 6.5 million with a preferred range being from about 5 million to about 6 million. Such polyethylenes are commercially available from American Hoechst Plastics Corporation under the name of Hostalen GUR.

The thermoset rubber compound is a cured rubber compound which typically has low friction as well as good oil and water resistant properties. By "low friction" it is meant that rubber bearings of a desired thickness range, when water lubricated, develop hydrodynamic lubrication at normal journal (shaft) operating speeds. Thin rubber bearings develop water-lubricated hydrodynamic friction at lower shaft speeds than any other known bearing material due to the plasto-elastohydrodynamic pocket-forming effect. Hydrodynamic lubrication is the developing of a fluid film between the bearing and a rotating shaft. By the terms "oil and water resistant," it is meant that the elastomer is unaffected (not dissolved or softened) and the volume increase caused by the swell is under 5%, and preferably under 3%.

Figure 6:
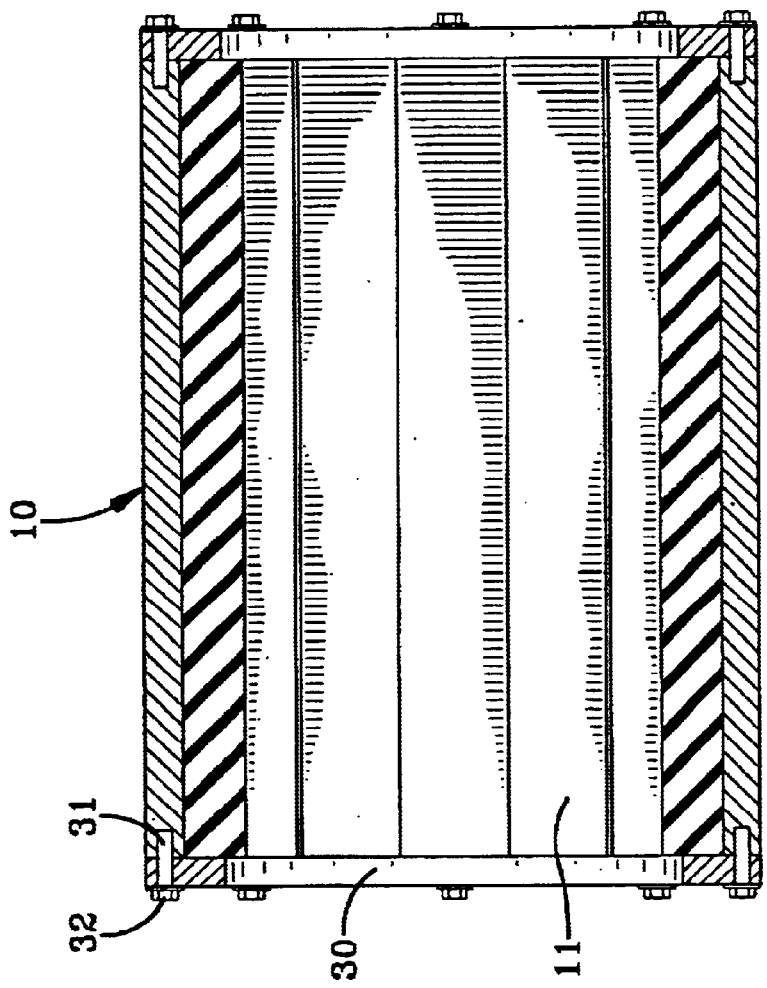
FIG. 6 is a cross-sectional view of the preferred embodiment of a SPA super demountable bearing taken along line 6—6 of FIG. 1.
Figure 5:
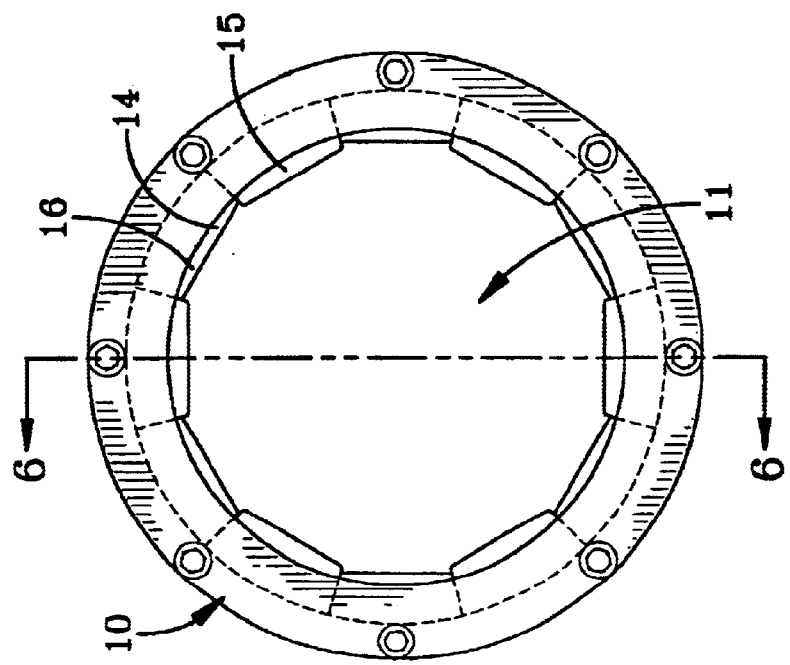
FIG. 5 is a front view of the bearing shown in FIG. 1.

FIG. 5 shows an end view of bearing housing 10 and the bearing assembly showing the circumferential spacing of the plurality of composite SPA staves 15, wherein between each of the pairs of composite SPA staves 15 is a rubber stave 14. The differential in radial thickness of the rubber staves 14 and the composite staves 15 can be shown in detail in this view, as well as the resulting longitudinal channel 16 formed between the composite SPA staves 15 for water lubrication purposes. The number of composite SPA staves 15 and rubber staves 14, and their respective thicknesses, will depend on the diameter of the bearing housing 10, the diameter of the propeller shaft the composite staves 15 are supporting, and design choice. A plurality of at least three composite staves is recommended. The axial length of composite staves 15, as illustrated in FIG. 6, will depend on the length of the bearing housing. The axial length of rubber staves 14 depends both on the length of the bearing housing and the axial compression required to obtain the desired lateral expansion of the rubber staves. In the preferred aspect of the invention, the length-to-diameter ration (L/D) for the bearing housing is 2, but values of 1 or less can be used. The rubber staves 14 will be slightly longer than the composite SPA staves 15 so that they will protrude from the bearing housing 10 before installation of the compression ring 30. The added length of the rubber staves 14 will be reduced to the axial length of the composite staves 15 and the bearing housing, and cause the circumference of the rubber staves 14 to expand. The circumferentially expanding rubber staves 14 lock the adjoining composite staves 15 into place in the bearing housing 10. The rubber staves are not actually compressed (reduced in volume), but they are usefully distorted.

The new super demountable designs thus combine the best features of the existing demountable bearings with the performance advantages of the new Slippery Polymer Alloy (SPA). The super demountable bearing of FIG. 1 can be used for operating on an inland waterway. The flat-land SPA staves 15 carry the load and aid in grit rejection, the demountable rubber staves 14 lock them in place as the compression end ring is bolted onto the flange. The rubber staves 14 are preferably molded, but could be cut from a molded flat sheet of rubber which could be machined to curve its surface which engages the curved surface of the housing. The SPA staves 15 are machined with a round back as noted above to fit the housing. Because of the soft gripping action of the rubber staves 14, the bearing clearance can be adjusted at installation by adding or subtracting shims between the SPA stave backs and the housing. The length-to-diameter ratio is 2.

Thus, the geometric shape of the composite SPA staves 15 is shown in FIGS. 7, 8 and 9. Stave 15 is generally trapezoidal in cross-sectional shape having a pair of side surfaces or faces 21, 22, a linearly disposed outer rounded surface 23 and an inner flat bearing face or surface 24. The composite SPA staves are machined with a round back to fit the bearing housing 10. The rubber staves can be molded as noted above or cut from a flat sheet.

Figure 10:
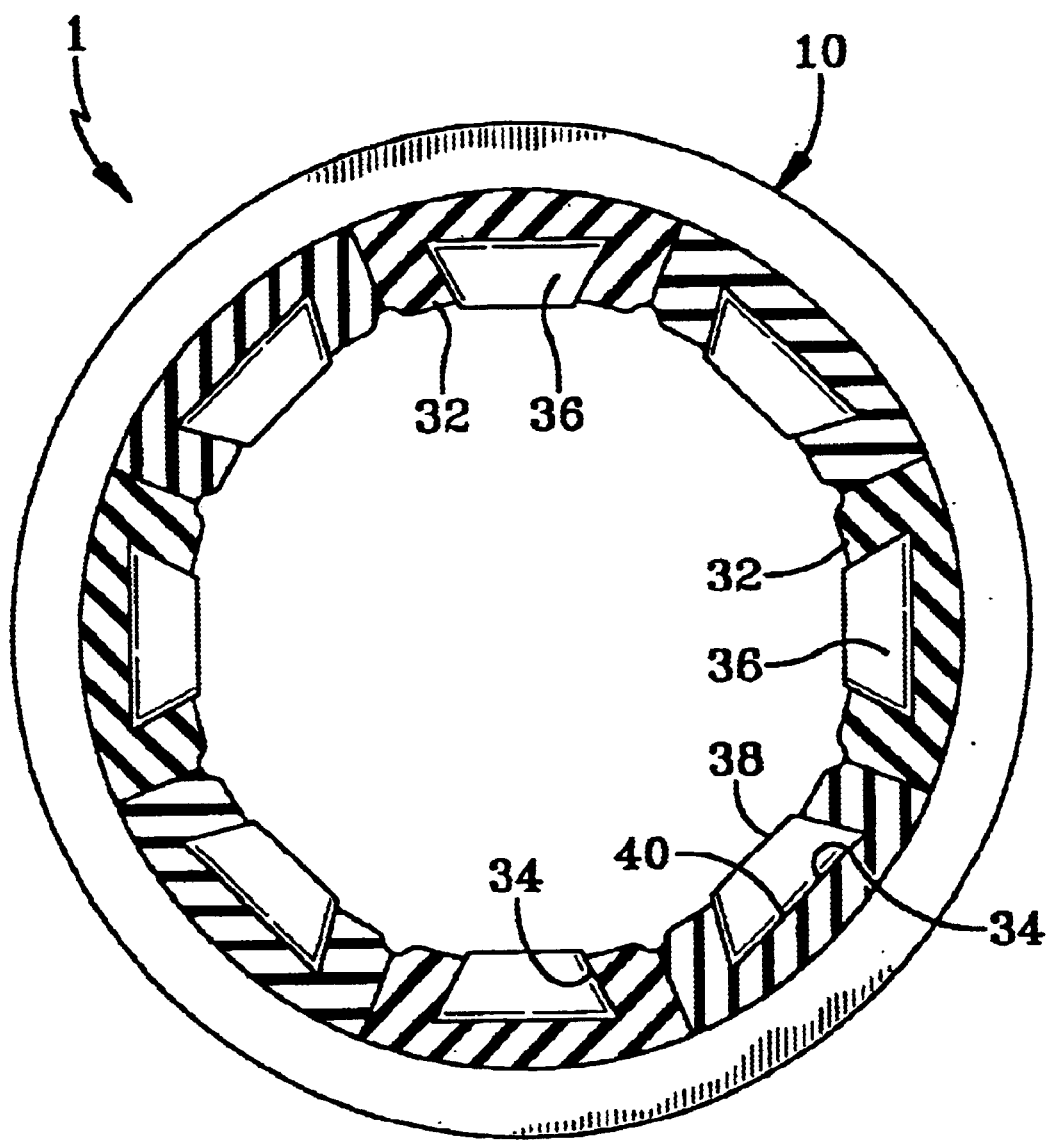
FIG. 10 is a cross-sectional view of another embodiment of the invention.
Figure 11:
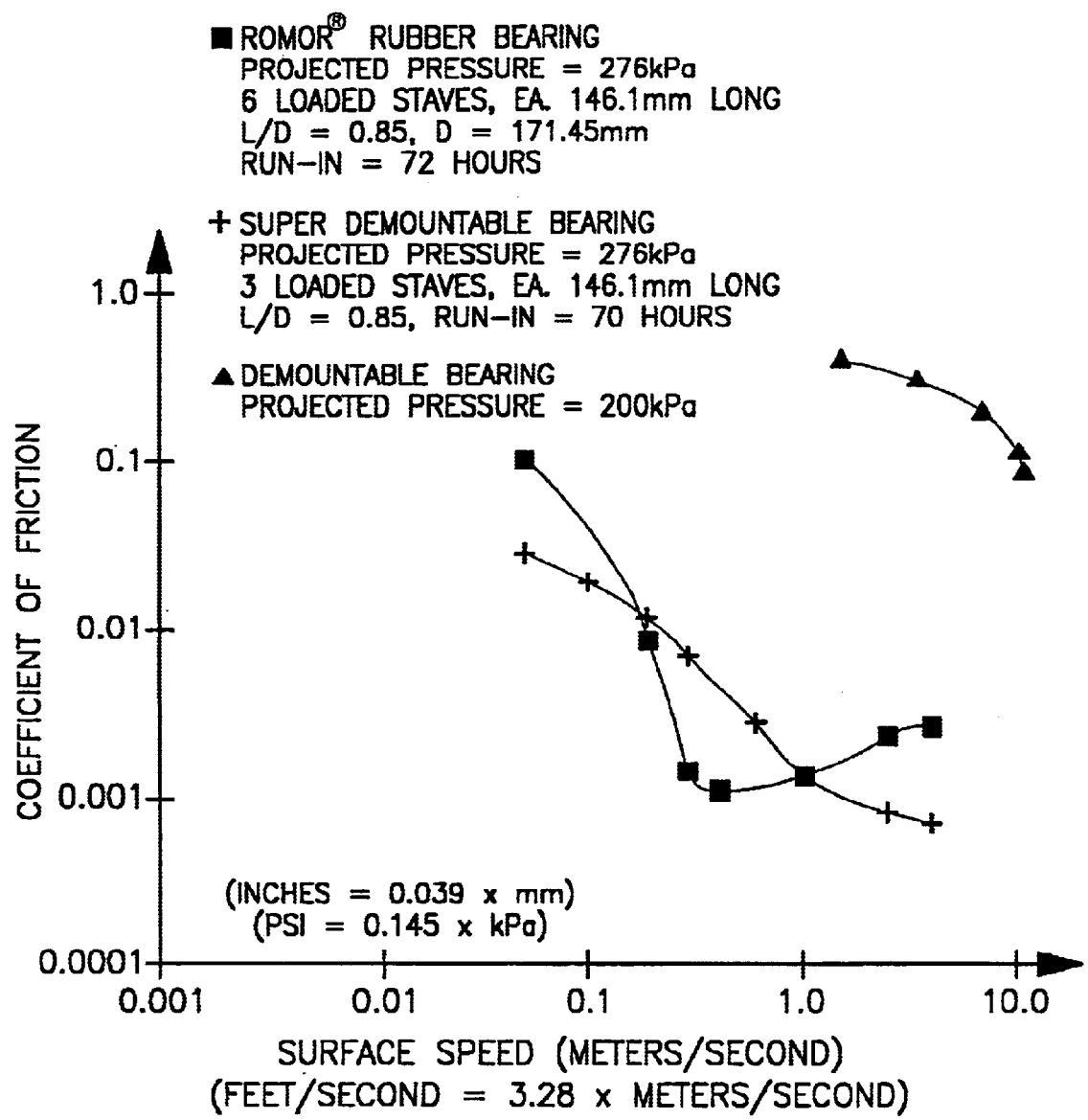
FIG. 11 is a graph of the coefficient of friction versus surface speed for a demountable bearing, for a super demountable bearing assembly according to the invention and for a prior art Romor® stave bearing.

It will be desirable in some new and retrofit applications to completely eliminate a metal intermediate housing and install the super demountable bearing directly into a ship's stem tube. FIG. 10 shows another version of the super demountable bearing assembly 1 where the SPA staves 36 are inserted into longitudinal grooves 34 in the rubber locking staves 34. An additional advantage is that the portions of the rubber staves radially outboard of the SPA staves act as a means of self-alignment with the shaft line. Thus, FIG. 10 shows a bearing assembly 130 with a housing 10 as discussed earlier, a set of circumferentially spaced rubber locking staves 32 having generally dovetail grooves 34 cut therein for receiving composite SPA staves 36. SPA staves 36 are similar in shape to SPA staves 15 discussed earlier, but can have flat shaft-facing surfaces 38 and flat housing-facing surfaces 40. FIG. 11 compares Coefficient of Friction versus Shaft Speed results for the demountable, super demountable and ROMOR® stave bearings.

The three load-carrying staves in the super demountable design shown in FIG. 11 can have spaced lugs designed in such a manner that the lugs on each stave will contact the shaft in locations different from those of the other two loaded staves, the contact pressure is increased more into the optimum range and the contact stress is the same value for all three staves.

Figure 12A:
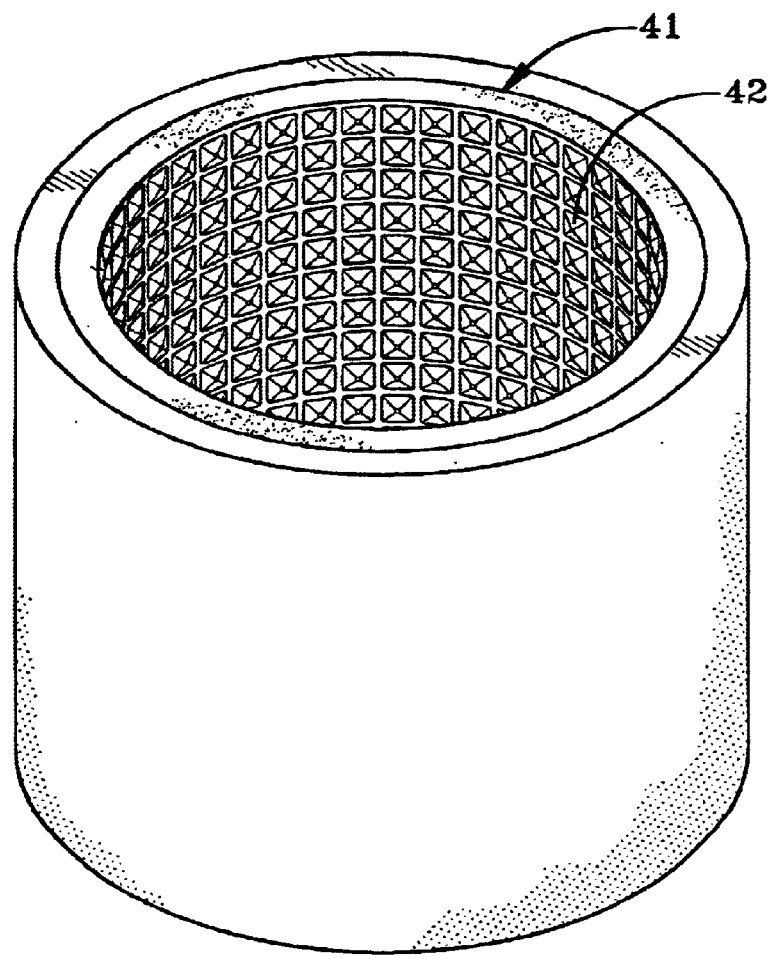
FIG. 12a is a round bore SPA bearing having an embossed pattern on the bearing surface.
Figure 12B:
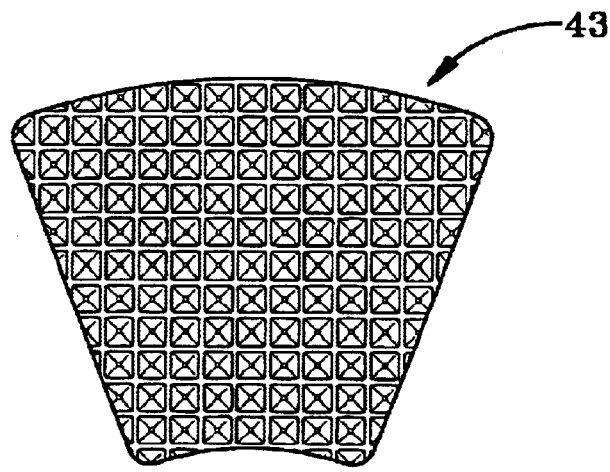
FIG. 12b is a non-pivoting thrust bearing having the characteristics of the bearing shown in FIG. 12.
Figure 13:
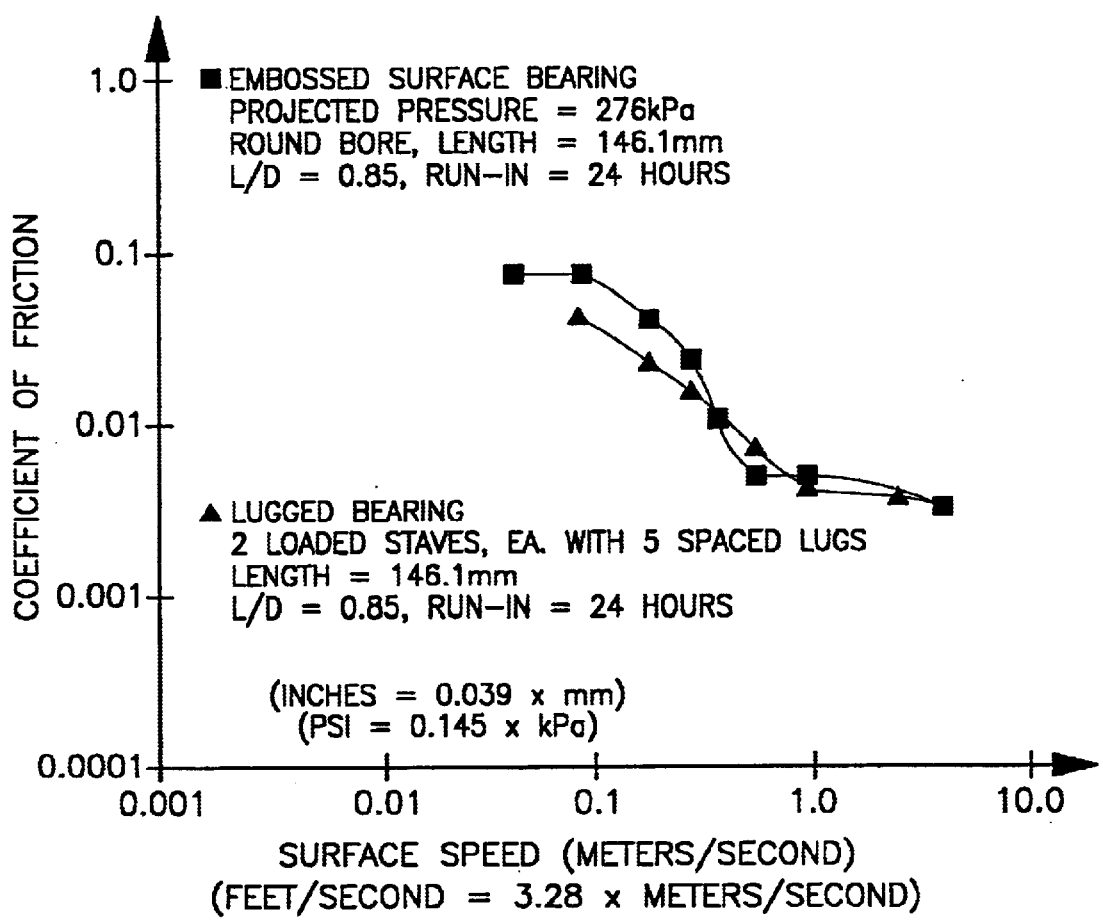
FIG. 13 is a plot of coefficient values for the round bore bearing assembly of FIG. 12a and of the lugged bearing shown in FIG. 4.

Any SPA contact can be made to act hydrodynamically if it is designed correctly. FIG. 12A shows a round bore SPA bearing 41 with an embossed pattern 42 on the bearing surface in order to increase the contact stress and also allow spaces for the lubricating water to enter and flow through it. Shown in FIG. 12B is a non-pivoting thrust-bearing pad 43 with the embossed pattern. FIG. 13 is a plot of coefficient of friction values for the round bore embossed design and for the spaced lugged bearing. Both had 24 hours run-in. The two curves are very similar. An embossed pattern SPA bearing was tested for a vertical pump application as part of a program during which ten bearings from around the world were each tested running dry. Many of the other bearings melted or distorted. The SPA bearing was rated the best of the ten because there was no wear or apparent damage to it or even a visible contact patch.

Figure 14:
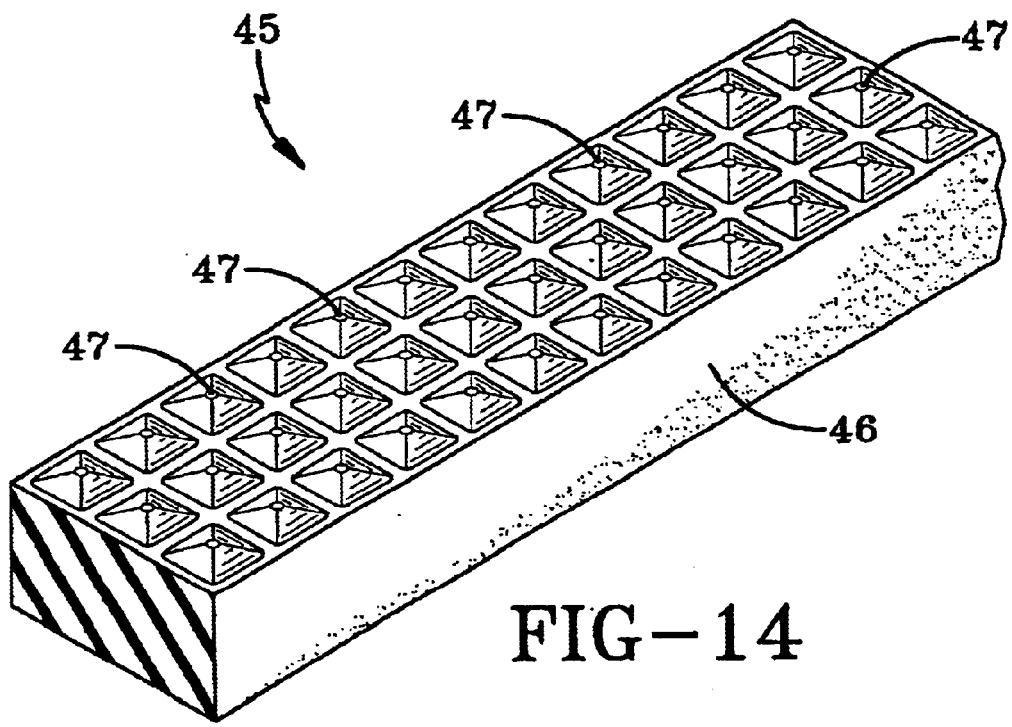
FIG. 14 is a perspective view of a SPA stave bearing having one type of protuberance.

A SPA stave having a discontinuous surface is shown in FIG. 14 by the numeral 45. SPA stave 45 has a body portion 46 with a plurality of diamond-shaped protuberances, lands or contact points 47 which can each become hydrodynamic contact points when fluid lubricated.

Figure 16:
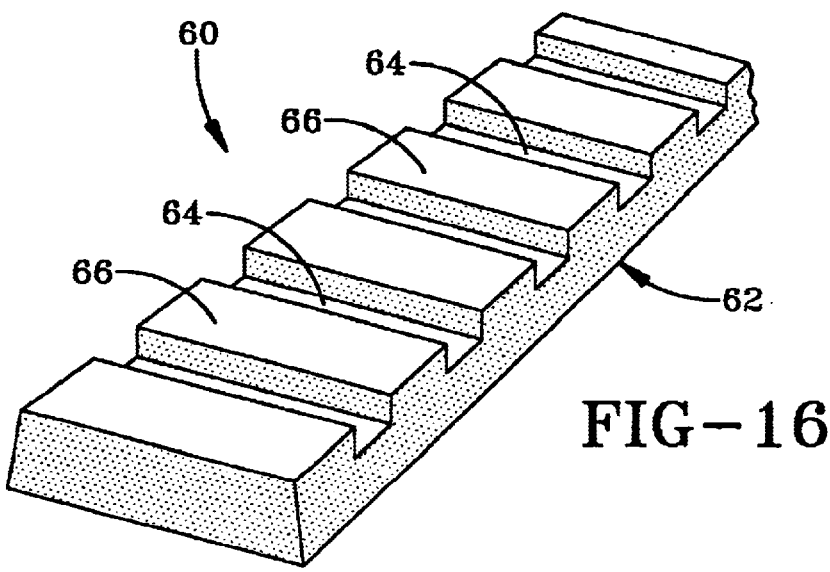
FIG. 16 is a perspective view of a SPA bearing having grooves defining lands for engaging a shaft.
Figure 15:
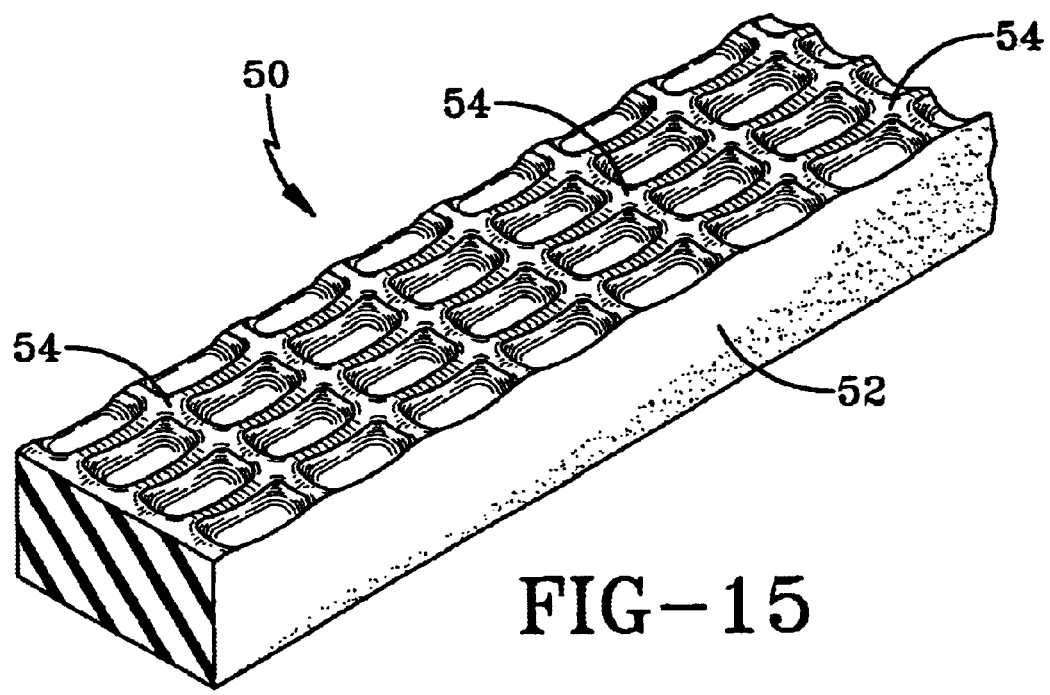
FIG. 15 is a perspective view of a SPA stave bearing having another type of protuberance.

Likewise, FIG. 15 shows another SPA stave 50 having a body portion 52 having a plurality of lands, protuberances or contact points 54 which can each become hydrodynamic bearing surfaces when lubricated by a fluid. Another version is shown in FIG. 16 wherein a SPA stave 60 has a body portion 62 which is provided with a series of transverse, parallel grooves 64 defining a series of lands or protrusions 66. Grooves 64 are preferably machined in body portion 62, but they could be molded as well. Machining grooves in the staves increases the amount of contact pressure in between the grooves. The stave dimensions and groove dimensions must be chosen such that the applied load is high enough for low friction and wear to occur, but the shape factor (bulge ratio) must be also low enough for the staves to adjust and form a lubricant-trapping pocket.

The staves shown in FIGS. 14 and 15 are preferably made from bearing material which is molded in large flexible slabs. The material is molded and shaped against a plate or rough fabric to provide a surface with many protuberances or contact points 47, 54 wherein the protuberances can each individually become hydrodynamic bearing surfaces when fluid lubricated.

Each stave 45, 50 and 60 in FIGS. 14–16 in a stave-type bearing functions as an individual and independent bearing surface. In addition, the diamond-shaped protuberances 47, contact points 54, and lands 66 in each of staves 45, 50, and 60 each function as an individual and independent bearing surface; the recessed areas around members form lubricant trapping pockets to provide the hydrodynamic bearing surface discussed above.

The deflection capability of bearings incorporating the latter staves provides for a zero clearance bearing (ZCB). ZCB's are most stable because, among other things, the unloaded staves can be depressed by the rotating water-lubricated shaft as it develops hydrodynamically pressurized lift-off pressure on the load-carrying staves, thereby giving a minimum clearance. Furthermore, gritty water stave wear in a ZCB will be greatly reduced because the reverse flow particle rejection process is most efficient when the shaft or journal is in contact with all of the staves (no unloaded clearance space). In a ZCB, there is initially unloaded zero clearance between all of the staves and the shaft. In a conventional stave bearing designed with initial clearance, the side or top staves are unloaded with the shaft not touching them. The efficiency of the reverse flow particle rejection process is reduced with increasing clearance, thereby causing wear of surfaces of the side or top staves. The grit particles pass through the clearance space instead of being rejected back, thereby counter-flowing out through the water grooves.

When three staves are used, they are preferably located approximately 120° apart with the two upper staves located approximately 30° above a horizontal line and the lower stave located approximately 90° below horizontal.

The invention has numerous advantages, some of which have been described above. As explained above, the SPA component of the bearing assembly can have an embossed pattern or other discontinuous surface elements. These provide multiple contact, nonconforming water-lubricated polymer alloy bearing surfaces. By multiple contact, this term refers to the multiple contact of the discontinuous surfaces of each bearing stave which contact the shaft. The bearing assembly is nonconforming in that the various flat bearing staves absorb different amounts of radial pressure from the rotating shaft, as opposed to a single bearing stave and cylindrical round bore absorbing all of the radial pressure.

The friction between the surface elements in a SPA stave according to the invention has been found to decrease with increased load, rather than increasing as would have been expected from prior art bearings which lack the discontinuous surfaces. This is apparent from tests done on the testing apparatus discussed earlier. These tests establish that the discontinuous surfaces of the SPA bearing material create lubricant pockets on the bearing element such as the SPA bearing stave according to the invention. The lubricant is not the solid lubricant used to make SPA, but is rather the fluid in which the shaft is rotating, which for ships and boats is water. The tests showed that the decrease in friction is at least in part due to the creation of lubricant pockets on the bearing.

The bearing assembly of the present invention can improve fuel efficiency. This is because of the low coefficients of friction throughout the full operating range (including breakaway).

It has been the practice to attach rubber stave bearings to the inner surface of a cylindrical bearing shell, and then to attach the outer surface of the shell to the inner surface of a stem tube or strut. According to present invention, the shell can be dispensed with and the locked stave system can be mounted directly inside of the stern tube or strut.

The staves can be removed and replaced without removing the shaft, to lower installation time and costs. The bearing assembly can be operated with very little noise at low shaft speed during shaft reversals.

It has been explained that bearing assemblies according to the invention exhibit low bearing wear. It has been found that abrasive laden water has minimal affect on the inventive bearing assembly. Tests have shown that there is improved journal life.

The super demountable bearing design has considerable potential for both commercial and naval vessels of all size for main shaft and rudder bearings. It will be able to be used in open systems lubricated with seawater, and closed systems possibly with no need for pumps. (Natural convection heat transfer would be used, utilizing the friction heat as the energy source.) Shaft sleeve sizes can be reduced and possibly eliminated in some cases. Bearing length-to-diameter ratios can be reduced to two or even one or less in some applications.

It is interesting to see how the new super demountable bearing designs compare with the earlier-noted Smith and Schneider's list of nine items related to bearing life discussed earlier:

1. Load—Wear and friction values are both substantially reduced with increasing load enabling L/D values to be substantially reduced (to 2 or less).
2. Rubbing Velocity—SPA staves operate very well dry for significant time intervals at slow shaft speeds as well as operate successfully in the boundary-lubricated regime.
3. Velocity—Time Interactions—The super demountable bearing runs in after 20 to 70 hours of operation.
4. Time at Zero Velocity—Breakaway friction values are very low and do not change with extended dwell time. Typical comparison values are 0.15 to 0.20 for the super demountable designs, 0.42 for polyurethane bearings, and 0.50 for Romor® rubber bearings.
5. Total Operating Time—SPA bearings are long lived. The first SPA solid-pack staved bearing has been successfully operating in a navel vessel since 1990.
6. Shaft and Bearing Roughness—SPA bearings will run on any shaft roughness. It will, over time, favorably change the surface texture without necessarily changing the surface finish. FIGS. 17–19 show three different surface textures for the same surface finish (roughness). A new shaft has a texture similar to the enlarged surface 70 shown in FIG. 17. After clean water run-in at one test lab, the surface of a shaft running against SPA had the surface texture shown in enlarged surface 80 in FIG. 18 with almost no change in measurable shaft finish or diameter. After further hundreds of hours of operation in very gritty water, the shaft diameter and surface finish had not changed, as shown schematically in FIG. 19 at enlarged surface 90.
7. Type and Amount of Abrasive—Abrasive laden water has minimal effect on a super demountable SPA bearing/shaft system.
8. Uniformity of Loading—The ability of SPA staves to elastically distort under compressive loads, the self-aligning capability of the super demountable bearing design and the effect of reduced L/D ratios all contribute to more uniform loading.
9. Shaft and Bearing Materials—The SPA staves in the super demountable bearing design performs well with all of the commonly used metal shaft materials.

Along with extended system wear life, the other two performance judgment factors of Smith and Schneider are satisfied by the super demountable bearing: very slow static and running friction and no noise (stick/slip) producing tendencies.

The conclusion to be drawn from the data is that the super demountable bearing with SPA load-supporting staves promises to make possible water-lubricated bearing/shaft systems with useful lives exceeding 15 years.

The invention has been described in detail, with particular emphasis having been placed on the preferred embodiment, but variations and modifications with the spirit and scope of the invention may occur to those skilled in the art to which the invention pertains.

We claim:

1. A bearing assembly for water-lubricated shafts, said assembly comprising:
   a housing having an inner surface defining a bore for receiving a shaft for rotation in a body of water;
   a set of longitudinally extending elastomeric staves extending along the inner surface of said housing and being held in place against outward radial movement by said housing, said elastomeric staves defining supporting structure for supporting and holding in circumferential and inward radial position a set of longitudinally extending SPA staves;
   a set of longitudinally extending SPA staves supported by said supporting structure, said SPA staves having shaft-engaging surfaces for engaging, lubricating and holding the alignment of the shaft; and
   a compression member for longitudinally compressing said elastomeric staves to cause the circumference of said elastomeric staves to expand around the inner circumference of said housing to lock said SPA staves in place in said housing.

2. A bearing assembly according to claim 1 wherein said elastomeric staves establish parallel longitudinally-extending spaces between said elastomeric staves to support said SPA staves and the expansion of said elastomeric staves around the inner circumference of said housing establishes lateral pressure by said elastomeric staves, and said SPA staves extend along said longitudinally extending spaces and are supported by the lateral pressure from said elastomeric staves.

3. A bearing assembly according to claim 2 wherein said SPA staves have a radial thickness in excess of the radial thickness of said elastomeric staves, said SPA staves but not said elastomeric staves being engageable with a shaft rotating in said bearing assembly.

4. A bearing assembly according to claim 2 wherein said SPA staves have a flat shaft-facing surface, an opposite housing-facing surface to match the curvature of the inside surface of said housing and a chord width larger than the width of said housing-facing surfaces, and diverging sides connecting the shaft-facing surface and the housing-facing surface.

5. A bearing assembly according to claim 1 wherein said elastomeric staves are rubber staves.

6. A bearing assembly according to claim 1 wherein said elastomeric staves have surfaces defining longitudinally extending grooves on the shaft-facing surface of said elastomeric staves, and said SPA staves being disposed in said grooves and supported by said surfaces.

7. A bearing assembly according to claim 6 wherein said shaft-facing staves have protuberances on their shaft-facing surfaces for contacting a water-lubricated rotating shaft to form lubricant-trapping pockets and establish plasto-elastohydrodynamic lubrication.

8. A bearing assembly according to claim 1 wherein a longitudinally-extending channel is defined by adjacent elastomeric staves and SPA staves for receiving water for lubricating a shaft rotating in said bearing assembly.

9. A bearing assembly according to claim 1 wherein said shaft engaging surfaces of said SPA staves have protuberances for contacting a water-lubricated rotating shaft to form lubricant-trapping pockets and establish plasto-elastohydrodynamic lubrication.

10. A bearing assembly according to claim 1 wherein said housing is inserted into a stern tube.

11. A bearing assembly according to claim 1 wherein said housing is attached to a strut.

12. A bearing assembly for water-lubricated shafts, said assembly comprising:
a housing having an inner surface defining a bore for receiving a shaft for rotation in a body of water, and further having a predetermined length and an end portion;
a set of longitudinally extending SPA staves supported by said supporting structure, said SPA staves each having shaft-engaging surfaces for engaging, lubricating and holding the alignment of the shaft;
a set of longitudinally extending elastomeric staves extending along the inner surface of said housing and being held in place against outward radial movement by said housing, said elastomeric staves defining supporting structure for supporting and holding in circumferential and inward radial position a set of longitudinally extending SPA staves, said elastomeric staves each having a length exceeding the length of the housing and extending a short length beyond an end portion of the housing; and
a compression device for applying compression to said longitudinally extending elastomeric staves for applying lateral pressure against said SPA staves to hold said SPA staves in position in said bearing assembly.

13. A bearing assembly for water-lubricated shafts, said assembly comprising:
a housing having an inner surface defining a bore for receiving a shaft for rotation in a body of water, said housing having a predetermined length;
a set of longitudinally extending elastomeric staves extending along the inner surface of said housing and being held in place against outward radial movement by said housing, said elastomeric staves defining supporting structure for supporting and holding in circumferential and inward radial position a set of longitudinally extending SPA staves, said elastomeric staves being longer than said predetermined length of said housing and extending beyond an end portion of said housing;
a set of longitudinally extending SPA staves supported by said supporting structure, said SPA staves having shaft-engaging surfaces for engaging, lubricating and holding the alignment of the shaft; and
a compression device for applying compression to said elastomeric staves;
said elastomeric staves applying pressure laterally against said SPA staves to hold said SPA staves in position in said bearing assembly.

14. A bearing assembly for water-lubricated shafts, said assembly comprising:
a housing having an inner surface defining a bore for receiving a shaft for rotation in a body of water;
a set of longitudinally extending elastomeric staves extending along the inner surface of said housing and being held in place against outward radial movement by said housing, said elastomeric staves having shaft-facing surfaces and defining longitudinally extending dovetailed-shaped grooves on the shaft-facing surface forming receptacles for supporting and holding in circumferential and inward radial position a set of longitudinally extending SPA staves; and
a set of longitudinally extending SPA staves supported by said supporting structure, said SPA staves being generally dovetailed-shaped in longitudinal cross section to fit into and be retained by said dovetailed-shaped grooves in said elastomeric staves; said SPA staves having shaft-engaging surfaces for engaging, lubricating and holding the alignment of the shaft;
said elastomeric staves applying pressure laterally against said SPA staves to hold said SPA staves in position in said bearing assembly.

* * * * *